United States Patent
Drysdale et al.

(12)

(10) Patent No.: US 6,191,231 B1
(45) Date of Patent: Feb. 20, 2001

(54) GRAFTING OF POLYMERS WITH FLUOROCARBON COMPOUNDS

(75) Inventors: Neville Everton Drysdale, Newark; Lin Wang, Hockessin; Zhen Yu Yang, Wilmington, all of DE (US)

(73) Assignee: E. I. du Pont de Nemours and Company, Wilmington, DE (US)

( * ) Notice: Under 35 U.S.C. 154(b), the term of this patent shall be extended for 0 days.

(21) Appl. No.: 09/341,617

(22) PCT Filed: Jan. 20, 1998

(86) PCT No.: PCT/US98/00946

§ 371 Date: Jul. 13, 1999

§ 102(e) Date: Jul. 13, 1999

(87) PCT Pub. No.: WO98/31716

PCT Pub. Date: Jul. 23, 1998

Related U.S. Application Data

(60) Provisional application No. 60/035,873, filed on Jan. 22, 1997.

(51) Int. Cl.$^7$ .................................................. C08F 259/08

(52) U.S. Cl. .......................... 525/276; 525/288; 525/200; 526/242; 526/243; 526/247

(58) Field of Search ..................................... 525/276, 288, 525/200; 526/243, 242, 247

(56) References Cited

U.S. PATENT DOCUMENTS

| 3,718,627 | * | 2/1973 | Grot ....................................... 526/240 |
| 4,384,941 | * | 5/1983 | Okamoto et al. ..................... 204/296 |
| 5,264,508 | * | 11/1993 | Ishibe et al. .......................... 526/247 |

FOREIGN PATENT DOCUMENTS

| 5-202148 | * | 8/1993 | (JP) . |
| 5-331242 | * | 12/1993 | (JP) . |

* cited by examiner

*Primary Examiner*—James J. Seidleck
*Assistant Examiner*—Olga Asinovsky

(57) ABSTRACT

Fluorine containing terminal olefins may be grafted onto polymers containing hydrogen bound to carbon in the presence of free radicals. The olefins may also contain other functional groups. The resulting novel grafted polymers are useful as molding resins, for coating and as catalysts.

11 Claims, No Drawings

GRAFTING OF POLYMERS WITH FLUOROCARBON COMPOUNDS

This application Claims benefit of Provisional 60/035,873, filed Jan. 22, 1997 and this application is a 371 of PCT/US98/00946, filed Jan. 20, 1998.

FIELD OF THE INVENTION

Fluorine containing olefins can be grafted onto polymers containing carbon-hydrogen bonds in the presence of a source of free radicals. The resulting grafted polymers have unique structures, and may be used as catalysts.

TECHNICAL BACKGROUND

Organic polymers containing fluorine substitution have traditionally been made by (co)polymerizing one or more fluorine containing monomers, optionally with unfluorinated monomers. It is well known that polymers containing large amounts of fluorine often have desirable properties, such as improved heat and/or chemical resistance. However, polymers containing only relatively small amounts of fluorine also often have desirable properties (compared to unfluorinated polymers), such as altered surface properties or being useful as catalysts. Therefore versatile, cost effective methods of making polymers with relatively low fluorine contents are desired.

SUMMARY OF THE INVENTION

This invention concerns a process for producing a partially fluorinated polymer, comprising, contacting in the liquid phase a first polymer with contains hydrogen bound to carbon with a compound of the formula $H_2C=CHCR^1R^2R^6Y$, and a source of free radicals, wherein:

$R^1$ and $R^2$ are each independently fluorine or perfluoroalkyl containing 1 to 20 carbon atoms;

$R^6$ is fluorinated alkylene containing 1 to 20 carbon atoms and optionally containing one or more ether groups or alkylene containing 1 to 20 carbon atoms and optionally containing one or more ether groups; and Y is hydrogen or a functional group;

and provided that said contacting is carried out at a temperature at which said source of free radicals generates free radicals.

This invention also concerns a polymer, comprising, branches having the formula $-CH_2-CH_2CRiR^2R^6Y$, wherein:

$R^1$ and $R^2$ are each independently fluorine or perfluoroalkyl containing 1 to 20 carbon atoms;

$R^6$ is fluorinated alkylene containing 1 to 20 carbon atoms and optionally containing one or more ether groups or alkylene containing 1 to 20 carbon atoms and optionally containing one or more ether groups; and Y is hydrogen or a functional group;

and provided that a main chain of said polymer contains hydrogen bound to carbon.

DETAILS OF THE INVENTION

Herein certain terms are used, and they are defined below:

By "fluorinated alkylene" is meant an alkylene group containing one or more fluorine atoms.

By a "functional group" is meant any univalent group, as defined in R. T. Morrison, et al., Organic Chemistry, 6$^{th}$ Ed., Prentice hall, Englewood Cliffs, N.J., 1992, p. 167–168, and is an atom or group of atoms that defines the structure of a particular family of organic compounds and, at the same time, determines (at least partially) their properties. Any functional group present should not interfere with any contemplated reaction such as the grafting described above, nor should it result in any compound in which it is present being unusably unstable.

By "grafting herein" is meant attachment of a branch to a preexisting polymer. Herein a branch will usually be monomeric, i.e., contain only one of the grafting molecules.

By a "source of free radicals" is meant any compound or other means of generating free radicals such as ionizing radiation. If the free radicals are generated thermally, then the grafting reaction takes place at temperatures at which the source of free radicals reacts to form free radicals.

By "containing one or more ether groups" means containing one or more ether oxygen atoms between alkylene segments.

By hydrocarbyl is meant a univalent group containing on carbon and hydrogen. By substituted hydrocarbyl is meant a hydrocarbyl group containing one or more functional groups.

The grafting process described herein takes place in the liquid phase. This means that all of the ingredients are in the liquid phase at the time of the grafting reaction. However this does not mean that all of the ingredients must be in the same liquid phase, nor does it mean that any additional liquids must be present (such as a "solvent") during the process. The polymer itself and, or the fluorinated compound to be grafted may be liquids and liquify the other component. If a chemical free radical source is used, it too may be a liquid or dissolve in one of the other components, but it will often be present in relatively small quantities, and so unable to dissolve the other components.

Useful groups Y include $-SO_2F$, $-CO_2R^3$, $P(O)(OR^3)_2$, $-SO_3M$, and $-S(O)_2NHS(O)_2R^4$, wherein each $R^3$ is independently hydrocarbyl or substituted hydrocarbyl containing 1 to 20 carbon atoms, and $R^4$ is perfluoroalkyl containing 1 to 20 carbon atoms. In a preferred compound or polymer, Y is halogen, more preferably fluorine; sulfonyl fluoride: sulfonic acid; or hydrogen.

In preferred compounds and polymers $R^6$ contains 1 to 50 carbon atoms. Preferred groups $R^6$ are perfluoroalkylene or ether substituted pertluoroalkylene, and especially preferably $-(CF_2)_d-$ wherein d is 2 to 20 and $-CF_2OCF_2CF_2-$.

Sources of free radicals are well known in the art. see for instance J. Brandrup. et al., Ed.. Polymer Handbook, 3rd Ed., John Wiley & Sons, New York, 1989, p. II-I to II-65 and H. Mark, et al., Ed., Encyclopedia of Polymer Science and Engineering, vol. 13, John Wiley & Sons, New York, 1988, p. 754–789 both of which are hereby included by reference. These "sources" may be chemical compounds such as peroxides or other means of generating free radicals, such as ionizing radiation. Most commonly chemical compounds which are sources of free radicals will be used. These compounds may form free radicals by any method, for instance by decomposing thermally to form free radicals, or by the reaction of a redox couple to form free radicals. Thermal decomposition of a free radical source is a preferred method of forming free radicals. Useful sources of free radicals include compounds such as t-butyl peroxide and benzoyl peroxide. If a compound is used as a free radical source, relatively small amounts are usually used, about 0.1 to about 25 mole percent, preferably about 1 to 10 mole percent, of the grafting molecule present being typical.

The amount of grafting molecule, $H_2C=CHCR^1R^2R^6Y$, grafted onto the polymer will vary according to the amount of $H_2C=CHCR^1R^2R^6Y$ relative to the polymer, the amount of free radical source present, and the efficiency of the grafting process. It is preferred that about 1 g to about 5000 g, more preferably about 500 g to about 2000 g, of grafting molecule per kg of ungrafted (starting) polymer actually be grafted onto the polymer. In another preferred process and its resulting polymer, the grafted polymer has more hydrogen atoms than fluorine atoms, more preferably the ratio of hydrogen atoms to fluorine atoms is about 3 or more, especially preferably about 5 to about 150.

The polymers which may be grafted in the process described herein, i.e., are suitable, are those which do not suffer so much decomposition, typically lowering of molecular weight, in the presence of free radicals as to render the final product unusable. It is well known in the art, see for instance H. Mark. et al., Ed., Encyclopedia of Polymer Science and Engineering, vol. 13, John Wiley & Sons, New York, 1988, p. 667–682, that some polymers are relatively stable in the presence of free radicals, while others may undergo chain scission and lowering of molecular weight relatively easily. For example linear polyethylene is thought of as relatively stable, while most polypropylenes are thought to be relatively unstable.

Nevertheless, even "relatively unstable" polymers may be grafted under some circumstances. For instance, when it is desired to graft only a small amount of $H_2C=CHCR^1R^2R^6Y$ onto the polymer, only small amounts of free radical source may be needed, and the resulting loss of molecular weight (if any) in the polymer being grafted may be acceptable in the application contemplated.

Exposure to free radicals may also crosslink some polymers, depending on the conditions. A situation such as this may also be acceptable, since crosslinked polymers may be desired. For instance if used as a catalyst, the insolubility of a crosslinked polymer may be an advantage in recovering the polymer after use. Indeed in the process described herein a crosslinked polymer may be used as the starting polymer. In this instance it may be desirable to swell the crosslinked polymer with another compound or with $H_2C=CHCR^1R^2R^6Y$ and/or the free radical source to obtain more uniform grafting.

Preferred polymers to be grafted include polyethylene, especially (relatively) linear polyethylene, polyethers such as poly(tetramethylene ether) glycol, and ethylene copolymers such as ethylene/vinyl acetate copolymer and ethylene/methyl acrylate copolymer.

Reactions may be performed on the grafted polymer after the grafting reaction. For instance, functional groups grafted onto the polymer may be transformed into other functional groups.

The grafted polymers described herein may be used as molding resins, in coatings, or be used to form films. They may be blended with other polymers to modify those other polymers characteristics, such as surface properties. Grafted polymers containing functional groups may be useful as catalysts, see for instance Experiment 4.

In the Examples and Experiments, the following abbreviations are used:

3-Me-THF-3-methyltetrahydrofuran
DSC—differential scanning calorimetry
Mn—number average molecular weight
Mw—weight average molecular weight
mp—melting point
PD—polydispersity, Mw/Mn
RT—room temperature
TGA—thermogravimetric analysis
THF—tetrahydrofuran
Tm—melting point (for a polymer)

In all TGA analyses, the heating rate was 20° C./min, unless otherwise noted.

EXPERIMENT 1

Preparation Of $ICH_2CH_2CF_2CF_2OCF_2CF_2SO_2F$

A mixture of 213 g of $ICF_2CF_2OCF_2CF_2SO_2F$. 0.5 g of limonene and 30 g of $CH_2=CH_2$ was heated in a autoclave at 210° C. for 8 hours. Distillation of the mixture gave 187.3 g of title compound, bp 88–89° C./4 kPa. $^{19}F$ NMR: +45.0 (t. J=5.7 Hz. 1 F), –82.7 (m, 2 F), –87.2 (m, 2 F), –112.7 (m, 2 F), –119.3 (t, J=17.0 Hz, 2 F).

EXPERIMENT 2

Preparation of $CH_2=CHCF_2CF_2OCF_2CF_2SO_2F$

To a stirred solution of 136.2 g (0.3 mol) of $ICH_2CH_2CF_2CF_2OCF_2CF_2SO_2F$ and 200 mL of $CH_3CN$ was slowly added 38 g (0.376 mol) of $Et_3N$ at 75 to 80° C. over 6 hours. The reaction mixture was neutralized with conc. $H_2SO_4$ at 0° C., and then poured into water and extracted with ether. The ether layer was washed with water and dried over $MgSO_4$. After removal of the ether, a residue was distilled to give 65.3 g of pure product, bp 115–117° C. $^{19}F$ NMR: +45.1 (m, 1 F), –82.5 (m, 2 F), –87.8 (m, 2 F), 112.5 (m, 2 F), –118.0 (m, 2 F). $^1H$ NMR: 5.80–6.05(m).

EXAMPLE 1

Grafting Of Polyethylene With $CH_2=CHCF_2CF_2OCF_2CF_2SO_2F$

A four-necked flask fitted with a condenser and an additional funnel was charged with 7.5 g polyethylene (Hoechst wax PE-130, number average molecular weight of 3000), 16.3 g of $CH_2=CHCF_2CF_2OCF_2CF_2SO_2F$ and 60 mL of 1,2-dichlorobenzene. After the apparatus was partially evacuated and refilled with argon for several times, the flask was heated to 140° C. until all of the polyethylene dissolved, and then cooled to 120° C. A solution of 1.23 g of di-t-butyl peroxide in 20 mL of 1,2-dichlorobenzene was slowly added over 5 h. After the addition was complete, the reaction mixture was stirred for 8 h. The hot solution with white solids was poured into 600 mL of acetone to precipitate the polymer. Filtration and wash with acetone gave white solids which were dried at room temperature in vacuum to give 16.3 g of grafted polymer. $^1R$ (KBr): 1460 cm$^{-1}$ (s, $SO_2F$), 1205–1110 cm$^{-1}$ (s, C-F). Elemental analysis revealed that the polymer contained 3.94% sulfur, which indicated that equivalent weight of the polymer per —$SO_2F$ group was 813. Melting point of the polymer by DSC was 115° C. and 10% weight loss by TGA was at 380° C. in nitrogen.

EXAMPLE 2

Grafting Of High Density Polyethylene With $CH_2=CHCF_2CF_2OCF_2CF_2SO_2F$

A four-necked flask fitted with a condenser and an additional funnel was charged with 7.5 g high density polyethylene (Aldrich Chemical Co., Milwaukee. Wis., USA), Mw=125000). 16.3 g of $CH_2=CHCF_2CF_2OCF_2CF_2SO_2F$ and 80 mL of 1,2-dichlorobenzene. After the apparatus was partially evacuated and refilled with argon several times, the flask was heated to 140° C. until all of the polyethylene dissolved, and then cooled to 125° C. (very viscous solution). A solution of 1.23 g of di-t-butyl peroxide in 20 mL of 1,2-dichlorobenzene was added over 7 h. After the addition was complete, the reaction mixture was heated at 130° C. overnight. The hot solution with white solids was poured into 600 mL of acetone to precipitate the polymer, which was cut in the presence of wet ice in a blender to 16.7 g of fine power polymer.

EXAMPLE 3

Preparation Of A Sulfonic Acid-Containing Polymer

A mixture of 8.0 g of the grafted polymer of Example 1. 25 g of KOH, 15 mL of ethanol, 5 mL of THF and 2 mL of water was stirred at room temperature overnight and at 70° C. for 2 h. After removal of volatiles, the residue was treated with conc. HCl for 30 minutes, filtered, washed with water and aq. HCl and dried at 60° C. in vacuum for 24 h to give 6.7 g of solids, which could be pressed to film at 135° C.

EXAMPLE 4

Preparation Of A Sulfonic Acid-Containing Polymer

A mixture of 14.0 g of the grafted polymer of Example 2. 4.5 g of KOH, 50 mL of ethanol, 10 mL of THF and 3 mL of water was stirred at 60° C. for 5 h, and then at room temperature overnight. After removal of volatiles, residue was treated with conc. HCl for 40 minutes, filtered, washed with water and aq. HCl, and dried at 70° C. in a vacuum for 8 h to give 13.2 g of solids. MP by DSC was 105° C. and 10% weight loss by TGA was at 230° C. in $N_2$. The solids could be pressed to a film at 135° C. Elemental analysis revealed that catalyst contained 3.19% sulfur, which indicated that the polymer acid equivalent weight was around 1000.

EXPERIMENT 3

Synthesis Of Highly Branched Polyethylene

The compound

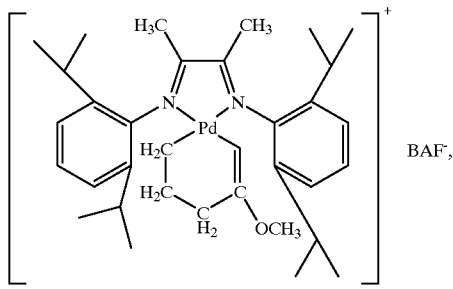

wherein BAF is tetrakis(3,5-trifluoromethylphenyl)borate (0.2952 g 0.2 mmol) was dissolved in 200 mL $CH_2Cl_2$ in a Schlenk flask in a drybox. The flask was connected to a Schlenk line and the flask was then briefly evacuated and refilled with ethylene from the Schienk line. This was stirred at RT under 101 kPa of ethylene for 18 h. Methanol (1200 mL) was then added to the solution, which resulted in precipitation of an oil. The oil was isolated, dissolved in 500 mL hexanes and was filtered through silica gel. Evaporation of hexanes and drying under vacuum gave 40 g of clear oil.

$^1$H NMR analysis ($CD_2Cl_2$): 124 methyls per 1000 methylene carbons. δ0.8–1.0 ppm, —$CH_3$, 1.1–1.4 ppm. —$CH_2$- and —CH—. The polymer exhibited a glass transition temperature of −63° C. by DSC. GPC (THF, polystyrene standard): Mw=108,000, Mn=69,800, PD=1.55.

EXAMPLE 5

Grafting $CH_2$=$CH(CF_2)_2O(CF_2)_2SO_2F$ Onto Highly Branched Polyethylene

Highly branched polyethylene of Experiment 3 (13.6 g) and $CH_2$=$CH(CF_2)_2O(CF_2)_2SO_2F$ (29.6 g, 90.8 mmol) were dissolved in 85 mL o-dichlorobenzene at 125° C. An o-dichlorobenzene solution of t-butyl peroxide (2.8 g in 30 mL o-dichlorobenzene) was added over a period of 8 h at 125° C. with stirring. The solution was then allowed to stir at 125° C. overnight. It was then cooled to RT and was poured into 400 mL methanol with stirring. The oil was isolated, washed with 3×100 mL methanol and was dried under vacuum at 70° C. for 6 h. A yellow viscousoil (38.14 g) was obtained. Comparison of the integral of the $CH_2CF_2$- (2.00 ppm based on $^1$H NMR in a solvent of $CD_2Cl_2$) with the integrals of methyls (0.8–1.0 ppm) and methylenes (1.1–1.4 ppm) indicated a graft comonomer content of 13.0 mol %. $^{19}$F NMR($CD_2Cl_2$): 46.2 ppm. —$SO_2F$; −81.2 ppm, −86.4 ppm, −111.1 ppm, −117.4 ppm, $CF_2$ peaks. The polymer exhibited a glass transition temperature of −53° C. by DSC. GPC (THF, polystyrene standard): Mw=87,200, Mn=51,000, PD=1.71.

EXAMPLE 6

Preparation Of A Potassium Sulfonate-Containing Polymer

The grafted polymer of Example 5 (23.64 g) was mixed with 10 g KOH, 70 mL THF, 60 mL ethanol and 5 mL water. Stirring the mixture at RT resulted in hydrolysis of the $SO_2F$ group. After stirring at RT for 2 h, this mixture was refluxed for 6 h. Solvent was then evaporated under vacuum at 60° C. for 8 h. The solid was dissolved in 400 mL acetone. The mixture was filtered through Celite®. To the filtrate was added 400 mL THF. This mixture was filtered through Celite®. Evaporation of solvents and vacuum drying gave 17.7 g a brittle yellow orange solid. This solid dissolves in water at RT. Its water Solution is neutral based.

EXAMPLE 7

Preparation Of A Sulfonic Acid-Containing Polymer

The product of Example 6 (15.0 g) was mixed with 80 mL of conc. HCl. This was vigorously stirred for 12 h. The resulting solid was filtered, washed with 2×5 mL conc. HCl and dried under vacuum at 70° C. for 6 h. A red solid (8.5 g) was obtained.

EXAMPLE 8

Grafting $CH_2$=$CH(CF_2O(CF_2)_2SO_2F$ Onto Poly (Tetramethylene Ether) Glycol

An o-dichlorobenzene solution of t-butyl peroxide (0.60 g peroxide in 7 mL o-dichlorobenzene) was slowly added to a solution of PThIEG (Mw=11,700, Mn=8,290, polystyrene standard, THF) in o-dichlorobenzene (3.56 g in 20 mL o-dichlorobenzene) at 125° C. The addition was completed in 2.5 h. The solution was allowed to stir at 125° C. for another 6 h. Volatiles were evaporated at 125° C. under full vacuum for 5 h, leaving 9.68 g of a white viscous oil as the product. $^{19}$F NMR(CD$_2$Cl$_2$): 44.5 ppm, —SO$_2$F; –82.8 ppm, –88.2 ppm, –112.8 ppm, –119.4 ppm, CF$_2$ peaks. The polymer exhibited a glass transition temperature of –68° C. by DSC. GPC (THF, polystyrene standard): Mw=27,800, Mn=1,300, PD=2.46.

EXAMPLE 9

Preparation Of A Potassium Sulfonate-Containing Polymer

To a mixture of 9.67 g of the product of Example 8, and 2.5 g KOH was added 20 mL THF, 15 mL ethanol and 1.5 mL water. Stirring at RT resulted an exothermic reaction. This was allowed to stir at RT for 1 h and was then refluxed for 5 h. The solvents were evaporated under vacuum. The solid was extracted with 100 mL acetone. This mixture was filtered through Celite®, followed by 3×10 mL acetone wash. To the filtrate was added 130 mL THF. This was filtered through Celite®. Evaporation of the solvents and drying under vacuum at 105 ° C. overnight gave 8.8 g of a brittle yellow solid. This product dissolves in water at RT to form a solution that is neutral.

EXAMPLE 10

Preparation Of A Sulfonic Acid-Containing Polymer

To 4.23 g of the polymer of Example 9 in a flask was added 20 mL conc. HCl. This mixture was allowed to vigorously stir for 20 min at RT. The top layer was decanted. This procedure was repeated another two times using 15 mL of conc. HCl. The viscous oil was dried at 105 ° C. under full vacuum for 6.5 h. A dark red viscous oil (2.41 g) was obtained.

EXAMPLE 11

The potassium salt of a hydrolyzed CH$_2$=CH(CF$_2$)$_2$O (CF$_2$)$_2$SO$_2$F grafted polyethylene (13 mol % of grafted comonomer, Mw=97.600, Mn=67,100) is soluble in water. The potassium salt of the hydrolyzed ethylene copolymer of CH$_2$=CH(CH$_2$)$_4$(CF$_2$)$_4$O(CF$_2$)$_2$SO$_2$F made with a Pd catalyst(8.5 mol % of comonomer, Mw=120,000, Mn=78, 900) is not very soluble in water.

The polymer made with the Pd catalyst was made by using the compound

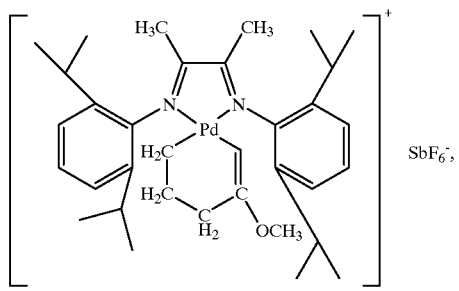

as the catalyst, and (0.0205 g, 0.024 mmol) and CH$_2$=CH (CH$_2$)$_4$(CF$_2$)$_4$O(CF$_2$)$_2$F (3.5 g, 7.26 mmol) were dissolved in 18 mL CH$_2$Cl$_2$ in a Schlenk flask in a drybox. The flask was connected to a Schlenk line and the flask was then briefly evacuated and refilled with ethylene from the Schlenk line. This was stirred at RT under 101 kPa of ethylene for 72 hr. Solvent was evaporated after filtration. The viscous oil was dissolved in 10 mL CH$_2$Cl$_2$, followed by addition of 100 mL methanol. The upper layer was decanted. The reverse precipitation was repeated two more time, followed by vacuum drying to yield 3.68 g of a light yellow viscous oil. GPC (THF, polystyrene standard): Mw=120, 000, Mn=78,900, P/D=1.54. The turnover numbers for ethylene and the comonomer are 2098 and 195, respectively. The polymer was hydrolyzed to produce a sulfonic acid containing polymer.

EXPERIMENT 4

Polymerization Of A Cyclic Ether

In a dry box, the product of Example 4 (0.50 g), THF (3.0 g), THF/3-Me-THF (55/45 mol %, 7.00 g) and acetic anhydride (0.50 g) were placed in a 20 mL vial equipped with a stirring bar. After stirring for one h at room temperature, the vial was removed from the dry box and the polymerization terminated by the addition of THF, water (1.00 mL) and ether. The solids were removed via filtration and the resulting filtrate concentrated at reduced pressure and then dried under vacuum, affording 2.91 g of polymer. GPC analysis (PS STD.): Mn=11300, Mw=16800, PD=1.48.

What is claimed is:

1. A process for producing a partially fluorinated polymer, comprising, contacting in the liquid phase a first polymer with contains hydrogen bound to carbon with a compound of the formula H$_2$C=CHCR$^1$R$^2$R$^6$Y, and a source of free radicals, wherein:

R$^1$ and R$^2$ are each independently fluorine or perfluoroalkyl containing 1 to 20 carbon atoms;

R$^6$ is fluorinated alkylene containing 1 to 20 carbon atoms and optionally containing one or more ether groups or alkylene containing 1 to 20 carbon atoms and optionally containing one or more ether groups; and Y is —SO$_2$F, —CO$_2$R$^3$, —P(O)(OR$^3$)$_2$, —SO$_3$H, —SO$_3$M or —S(O)$_2$NHS(O)R$^4$;

wherein:

each R$^3$ is independently hydrocarbyl or substituted hydrocarbyl containing 1 to 20 carbon atoms, R$^4$ is perfluoroalkyl containing 1 to 20 carbon atoms;

M is an alkali metal;

and provided that said contacting is carried out at a temperature at which said source of free radicals generates free radicals.

2. A polymer, comprising, branches having the formula —CH$_2$—CH$_2$CR$^1$R$^2$R$^6$Y, wherein:

R$^1$ and R$^2$ are each independently fluorine or perfluoroalkyl containing 1 to 20 carbon atoms;

R$^6$ is fluorinated alkylene containing 1 to 20 carbon atoms and optionally containing one or more ether groups or alkylene containing 1 to 20 carbon atoms and optionally containing one or more ether groups; and Y is —SO$_2$F, —CO$_2$R$^3$, —P(O)(OR$^3$)$_2$, SO$_3$H, —SO$_3$M or —S(O)$_2$NHS(O$_2$)R$^4$;

wherein:

each R$^3$ is independently hydrocarbyl or substituted hydrocarbyl containing 1 to 20 carbon atoms;

R$^4$ is perfluoroalkyl containing 1 to 20 carbon atoms;

M is an alkali metal;

and provided that a main chain of said polymer contains hydrogen bound to carbon.

3. The process as recited in claim 1 wherein R$^6$ is perfluoroalkylene or ether substituted perfluoroalkylene.

4. The process as recited in claim 1 wherein $R^6$ is —$(CF_2)_d$— wherein d is 2 to 20 or —$CF_2OCF_2CF_2$—.

5. The process as recited in claim 1 wherein Y is —$SO_2F$.

6. The polymer as recited in claim 2 wherein $R^6$ is —$(CF_2)_d$— wherein d is 2 to 20 or —$CF_2OCF_2CF_2$—, and Y is —$SO_2F$, —$SO_3M$ or —$SO_3H$.

7. The process as recited in claim 3 wherein Y is —$SO_2F$.

8. The polymer as recited in claim 2 wherein $R^6$ is perfluoroalkylene or ether substituted perfluoroalkylene.

9. The polymer as recited in claim 2 wherein $R^6$ is —$(CF_2)_d$— wherein d is 2 to 20 or —$CF_2OCF_2CF_2$—.

10. The polymer as recited in claim 2 wherein Y is —$SO_2F$.

11. The polymer as recited in claim 6 wherein Y is —$SO_2F$.

\* \* \* \* \*